United States Patent [19]
Warriner

[11] 3,810,705
[45] May 14, 1974

[54] PORTABLE DRIVE-IN PLATFORM
[76] Inventor: Gerald E. Warriner, The First National Bank Bld., Suite 707, Miami, Fla. 33131
[22] Filed: Mar. 10, 1972
[21] Appl. No.: 233,504

[52] U.S. Cl. .................................... 404/1, 52/174
[51] Int. Cl. ............................................. E01c 1/00
[58] Field of Search .............. 404/1, 17, 18, 35, 71, 404/173; 52/174, 33

[56] References Cited
UNITED STATES PATENTS
2,636,456   4/1953   Cooper ............................. 52/73 X
3,436,879   4/1969   Duke ............................... 52/174 X
2,636,424   4/1953   Lebert .................................. 404/1

Primary Examiner—Nile C. Byers, Jr.
Attorney, Agent, or Firm—Cushman, Darby & Cushman

[57] ABSTRACT

A method of constructing an automobile drive-in facility comprising making a shallow excavation in the earth and installing a below-grade foundation within the excavation, positioning on the foundation a prefabricated unitary metal platform having upwardly projecting islands which divide the upper surface of the platform into a plurality of automobile stalls, said upper surface being close to grade level when the platform is supported on the foundation, and backfilling earth around the edges of the platform. The platform is a horizontally elongated box-like body constructed of interconnected metal members.

2 Claims, 8 Drawing Figures

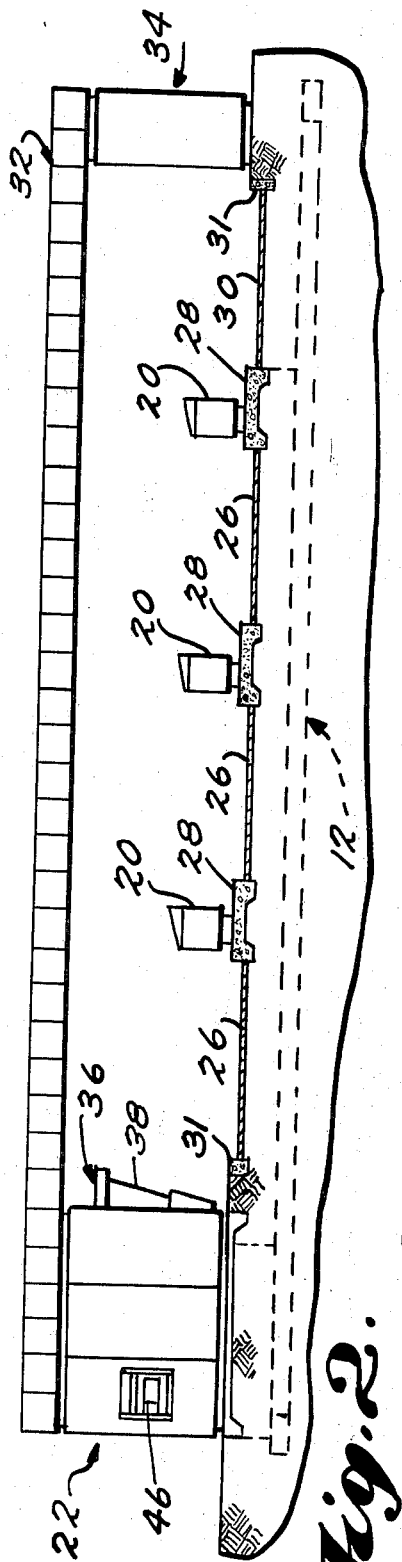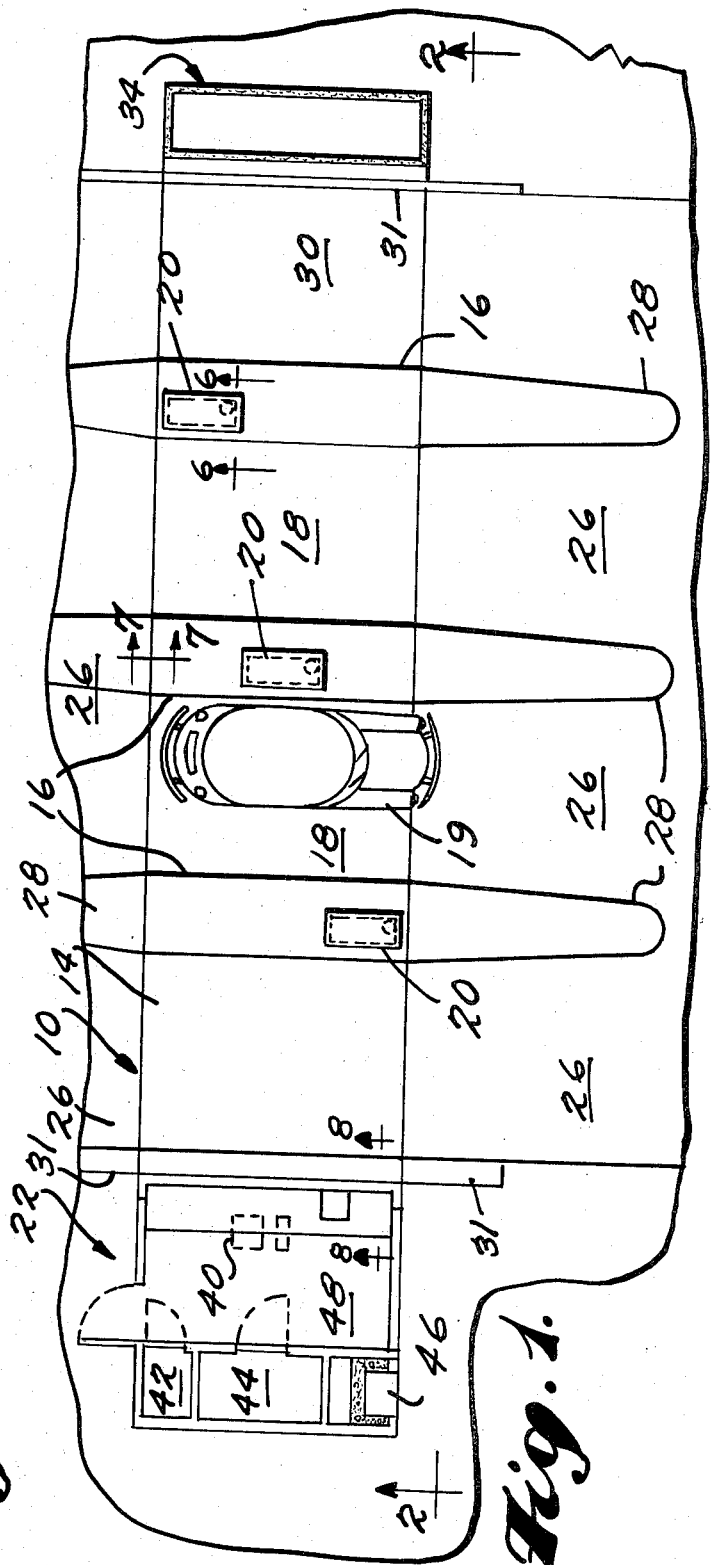

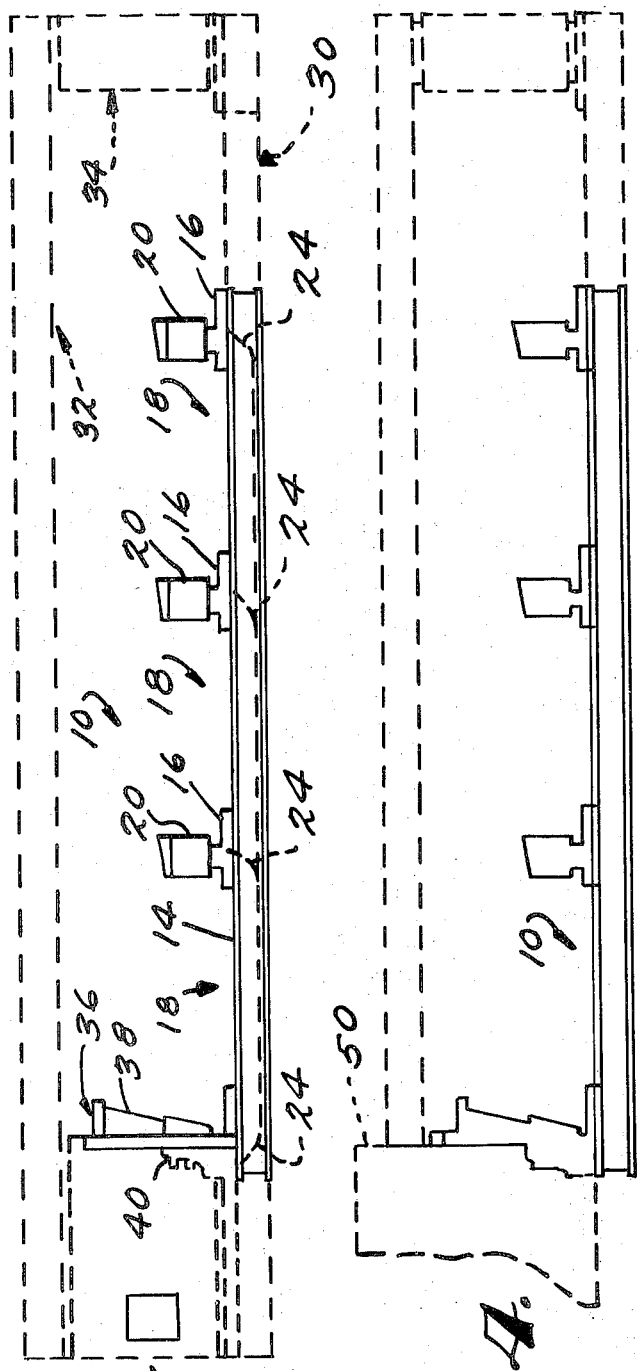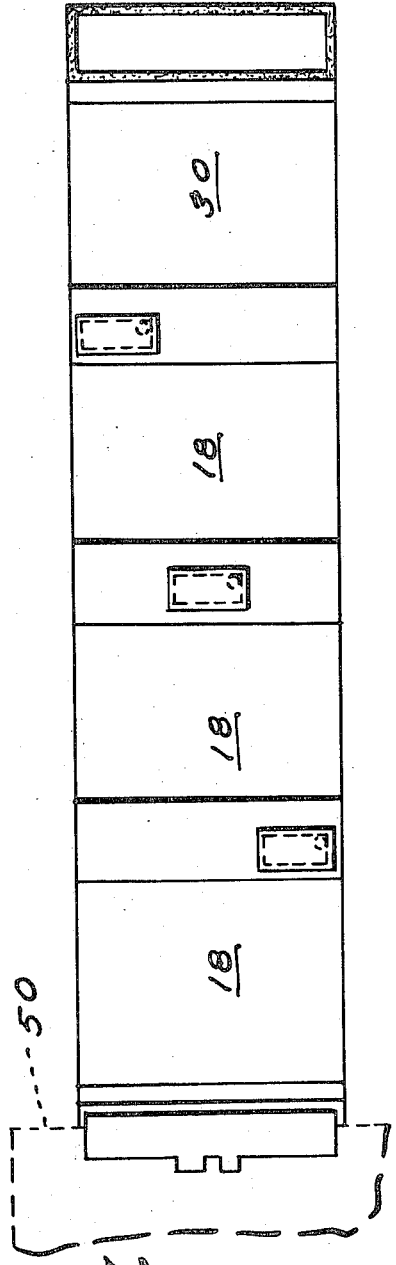

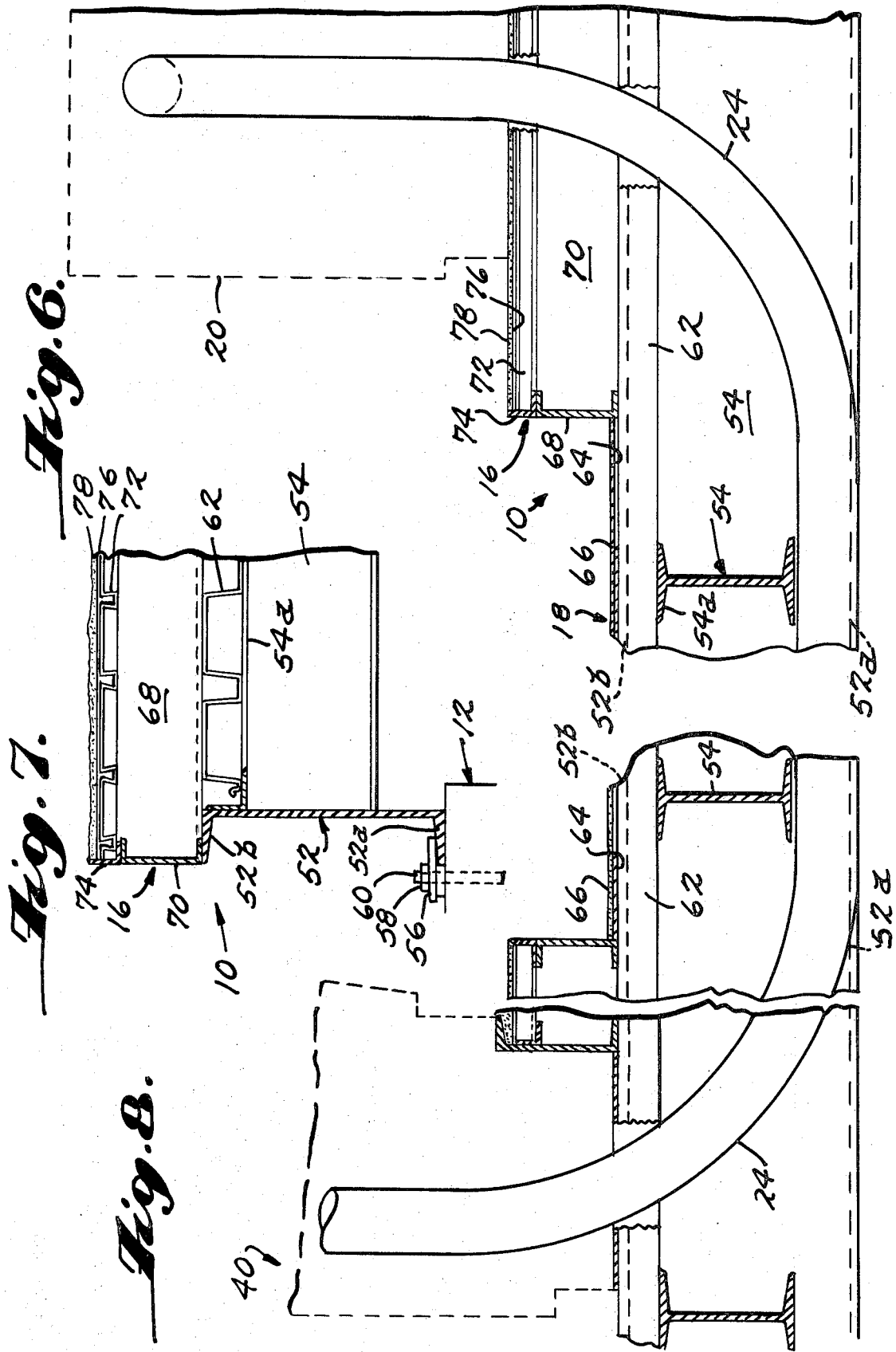

PORTABLE DRIVE-IN PLATFORM

This invention relates to an automobile drive-in facility and in particular to a prefabricated portable ground-engaging platform having a plurality of islands which define vehicle runways or driveways.

The platform is particularly suited for use in a drive-in bank facility in which case the platform will be provided with a teller console and with a plurality of remote customer units connecting with the teller console via pneumatic conveyor tubes. The construction of the pneumatic customer units, which may be conventional, forms no part of the present invention. Typically a pneumatic customer unit is an upstanding desk-like structure positioned to be accessible to the driver's side of an automobile so that the driver may conduct banking transactions by transmitting appropriate papers or money to the teller through a pneumatic conveying tube and by receiving back appropriate papers or money through the tube. The basic platform according to the preferred embodiment of the invention includes an elongated flat base or body structure, the aforementioned islands positioned on the upper surface of the base to define driveways or stalls, pneumatic customer units affixed to the islands, the pneumatic conveyor tubes and associated electrical circuitry disposed within the interior of the base, and a teller console connected via the tubes to each of several customer units.

Installation of the platform is effected by first carrying out preliminary site work including making a shallow excavation and a below-grade foundation suitable for receiving the platform. Approach curbing and major approach paving is also constructed. The platform is then brought in by truck and craned into position on its foundation. Electrical power hook-up is made, and a minor back-filling of earth around the platform together with minor approach paving are then carried out.

The invention will be further understood from the following detailed description taken with the drawings in which:

FIG. 1 is a plan view, with upper parts removed, of a drive-in bank facility;

FIG. 2 is sectional view taken on the line 2—2 of FIG. 1;

FIG. 3 is a side elevational view of the basic platform which forms a part of the facility illustrated in FIGS. 1 and 2;

FIGS. 4 and 5 are side elevational and plan views, respectively, of a platform adapted to be incorporated into an existing building, and FIGS. 6, 7 and 8 are sectional views taken on the lines 6—6, 7—7 and 8—8, respectively, of FIG. 1.

FIG. 1 illustrates schematically in plan view, with upper parts removed, a complete drive-in bank facility which includes a factory-assembled portable drive-in platform 10. The platform 10, which is shown in side elevation in FIG. 3, is supported on a below-grade foundation 12 in a position such that its upper surface 14 is close to grade level. The illustrated platform 10 includes an elongated, flat, box-like steel body having three upwardly projecting islands 16 which define three drive-in stalls 18 for automobile 19, each stall 18 being serviced by a pneumatic customer unit 20 carried on one of the islands 16. A teller room 22 is located at one end of the platform 10. Pneumatic conveyor tubes 24 extend from the booth 22 through the body of the platform 10 to each of the customer units 20.

The illustrated arrangement also includes ground-supported paving 26 and curbing 28 adjacent, the entrance and exit sides of the platform 10 and a ground-supported by-pass drive 30 at the end of the platform 10 remote from the teller room 22. Additional curbing 31 may be provided adjacent the teller room 22 and adjacent the drive 30. A canopy 32 shown in FIGS. 2 and 3 but not in FIG. 1, may also be provided between the teller room 22 and a suitable supporting structure 34 spaced from the remote end of the platform 10.

As seen in FIG. 3, pre-fabricated platform 10 also includes as part of its initial construction a console portion 36 located at the front of the teller room 22, this portion being the operational portion which includes a window 38, a teller's console 40 and framing adapted to be easily fitted to the front of the remainder of the room 22. As shown in FIG. 1, the room 22 may include a clothes closet 42, lavatory 44, and a night depository facility 46, in addition to the space 48 normally occupied by the teller in front of the console 40. The room 22, except for the window portion 36, may be constructed on site or in the form of a prefabricated module.

FIGS. 4 and 5 illustrate a substantially identical pre-fabricated platform 10 which is intended for use with an existing building 50. In this arrangement the canopy 32 is shown as being supported at one end by the window and console portion 36 of the platform, although it can be supported by the building 50 if desired.

Turning to FIGS. 6, 7 and 8 it will be seen that the platform 10 includes a body constructed of a pair of longitudinally extending side members in the form of outwardly facing steel channels 52 and a plurality of spaced-apart interval transverse members in the form of steel I-beams 54 extending between web portions of the channels 52. As seen in FIG. 7 the lower flange portions 52a of the channels 52 rest on the foundation 12 and are secured to the latter as with clamping plates 56 which are held in place by means of studs 58 and nuts 60. The space between the upper flange portions 54a of the beams 54 and the upper flange portions 52b of the channels 52 is occupied by a load-bearing deck structure which includes corrugated steel deck members 62 and a horizontal deck plate 64 having its upper surface covered with waterproof, wear-resistant material such as an asphalt-base composition 66.

Each island 16 is of box-like configuration constructed of a pair of spaced-apart channels 68 and a pair of channels 70 extending longitudinally of the platform 10 and supported on the upper flanges 52b of the main platform channels 52. A corrugated deck member 72 edged with angle pieces 74 is supported on the box-like structure and is provided with a sheet metal cover 76. The customer units 20 are secured to the islands 16 in any convenient manner. As shown in FIG. 6 the pneumatic conveyor tubes 24 are located inside the body of the platform 10 below the level of the transverse beams 54 and extend into their respective customer units 20 through holes in the deck members 62 and 70. The constructions of the base portion of the teller's portion 36 as shown in FIG. 8, is similar to the construction of the islands 16.

All connections between the various members may be made by welding or bolting.

While dimensions form no part of the invention it can be stated that the platform 10 may be 10 to 12 feet wide by 50 to 60 feet long by about 2 feet thick. The islands 16 may project about 8 inches above the upper surface of the platform body.

As described previously the overall facility is constructed by first preparing the site by excavating, laying the foundation 12 and installing the major approach paving 26 and 30 and the major curbing 28. The platform 10, which includes the body, the islands 16 the tubes 24 and if desired the customer units 20, and teller room portion 36 is then hauled from the factory to the site and set in place on the foundation 12. After electrical power hook-up has been effected dirt is backfilled around the platform 10, and minor additional paving and curbing is installed if needed. The canopy 32 and its support 34 can be constructed on site or provided in modular units suitable for assembly on site. The teller room window and console portion 36 may be fitted to an existing building 50 as illustrated in FIGS. 4 and 5, or alternatively the remainder of the room 22 may be constructed either before or after the platform 10 is set in place.

While the preferred embodiment of the invention is a platform for use in a drive-in bank facility, the basic platform which consists of the body and islands may be employed in other drive-in facilities. For example, in a drive-in restaurant facility the customer service lines would be merely voice transmission lines and would not include pneumatic conveyor tubes, and the customer control unit would merely receive food orders. Additionally, automobile service station gasoline pumps may be mounted on the platform.

What is claimed is:

1. A prefabricated platform assembly for use in constructing a drive-in facility comprising: a horizontally elongated box-like load-bearing body having a flat upper surface and being constructed of interconnected members, said body having a width about equal to the length of a small automobile and having a plurality of islands projecting above and supported on the upper surface of the body, said islands being spaced apart along the longitudinal dimension of said body and extending transversely across the body so as to divide said upper surface into a plurality of automobile stalls, each stall being of a width to accommodate at least one automobile; a customer service unit carried on each island, a customer control unit carried at one end of said box-like body and customer service lines including pneumatic conveyor tubes extending longitudinally inside said box-like body and connecting the control unit with each service unit.

2. A drive-in facility comprising: a prefabricated load-bearing box-like platform constructed with a deck which forms the upper surface of the platform and internal reinforcing members, said platform having a plurality of upwardly projecting islands which divide the decking of the platform into a plurality of automobile stalls, said platform also supporting a teller's console and window; a customer service unit adjacent each automobile stall; and pneumatic conveyor tubes disposed internally of said platform body and extending between said teller's console and each of said customer service units.

* * * * *